# (12) United States Patent
Tang et al.

(10) Patent No.: US 12,183,087 B2
(45) Date of Patent: *Dec. 31, 2024

(54) SEMANTICALLY AWARE KEYPOINT MATCHING

(71) Applicant: TOYOTA RESEARCH INSTITUTE, INC., Los Altos, CA (US)

(72) Inventors: Jiexiong Tang, Stockholm (SE); Rares Andrei Ambrus, San Francisco, CA (US); Vitor Guizilini, Santa Clara, CA (US); Adrien David Gaidon, Mountain View, CA (US)

(73) Assignee: TOYOTA RESEARCH INSTITUTE, INC., Los Altos, CA (US)

( * ) Notice: Subject to any disclaimer, the term of this patent is extended or adjusted under 35 U.S.C. 154(b) by 0 days.

This patent is subject to a terminal disclaimer.

(21) Appl. No.: 18/489,687

(22) Filed: Oct. 18, 2023

(65) Prior Publication Data

US 2024/0046655 A1   Feb. 8, 2024

Related U.S. Application Data

(63) Continuation of application No. 17/230,947, filed on Apr. 14, 2021, now Pat. No. 11,830,253.

(60) Provisional application No. 63/009,930, filed on Apr. 14, 2020.

(51) Int. Cl.
| | |
|---|---|
| *G06V 20/00* | (2022.01) |
| *G05D 1/00* | (2006.01) |
| *G06V 10/75* | (2022.01) |
| *G06V 20/56* | (2022.01) |

(52) U.S. Cl.
CPC .......... *G06V 20/56* (2022.01); *G05D 1/0221* (2013.01); *G05D 1/0246* (2013.01); *G06V 10/751* (2022.01)

(58) Field of Classification Search
CPC .... G06V 20/56; G06V 10/751; G05D 1/0221; G05D 1/0246
See application file for complete search history.

(56) References Cited

U.S. PATENT DOCUMENTS

| | | | |
|---|---|---|---|
| 11,830,253 B2 | 11/2023 | Tang et al. | |
| 2019/0025848 A1* | 1/2019 | Kolouri | ................ G05D 1/0246 |
| 2020/0357143 A1* | 11/2020 | Chiu | ..................... G06F 18/253 |
| 2020/0388071 A1* | 12/2020 | Grabner | ................. G06T 17/20 |

(Continued)

*Primary Examiner* — Md K Talukder
(74) *Attorney, Agent, or Firm* — Seyfarth Shaw LLP

(57) ABSTRACT

A method for keypoint matching performed by a semantically aware keypoint matching model includes generating a semanticly segmented image from an image captured by a sensor of an agent, the semanticly segmented image associating a respective semantic label with each pixel of a group of pixels associated with the image. The method also includes generating a set of augmented keypoint descriptors by augmenting, for each keypoint of the set of keypoints associated with the image, a keypoint descriptor with semantic information associated with one or more pixels, of the semantically segmented image, corresponding to the keypoint. The method further includes controlling an action of the agent in accordance with identifying a target image having one or more first augmented keypoint descriptors that match one or more second augmented keypoint descriptors of the set of augmented keypoint descriptors.

20 Claims, 7 Drawing Sheets

(56) References Cited

U.S. PATENT DOCUMENTS

2021/0270621 A1* 9/2021 Mayster ............... H04W 4/024
2021/0319236 A1* 10/2021 Tang ................... G05D 1/0221

* cited by examiner

SEMANTICALLY AWARE KEYPOINT MATCHING

CROSS-REFERENCE TO RELATED APPLICATION

This application is a continuation of U.S. patent application Ser. No. 17/230,947, entitled "SEMANTICALLY AWARE KEYPOINT MATCHING," filed on Apr. 14, 2021, which claims the benefit under 35 U.S.C. § 119(e) to U.S. Provisional Patent Application No. 63/009,930, filed on Apr. 14, 2020, and titled "SEMANTICALLY AWARE SELF-SUPERVISED KEYPOINT LEARNING," the disclosures of which are expressly incorporated by reference herein in their entireties.

FIELD OF THE DISCLOSURE

Aspects of the present disclosure generally relate to keypoint matching, and more particularly to techniques and apparatuses for semantically aware keypoint matching.

BACKGROUND

Keypoint matching may be used for image registration and localization. For example, a query image may be localized by matching keypoints of the query image with keypoints of images in a database. Conventional neural networks may be trained to match keypoints. In some examples, conventional systems may detect features and match detected features independent from certain geometric transformations, such as image translation, scale, and rotation. In some such examples, the conventional systems extract keypoints (e.g., characteristic points, feature points, or interest points) and generate a descriptor for each keypoint. The descriptor may be a string describing the keypoint. In such examples, the descriptor may be independent from geometric transformation. A machine-vision system may use one or both of the keypoints or descriptors to identify or track features in one or more images.

SUMMARY

In one aspect of the present disclosure, a method for keypoint matching includes receiving an input image obtained by a sensor of an agent. The method further includes identifying a set of keypoints of the received image. Each of the keypoints may correspond to a different descriptor. The method still further includes augmenting the descriptor of each of the keypoints with semantic information of the input image. The method also includes identifying a target image based on one or more semantically augmented descriptors of the target image matching one or more semantically augmented descriptors of the input image. The method further includes controlling an action of the agent in response to identifying the target.

Another aspect of the present disclosure is directed to an apparatus for keypoint matching. The apparatus includes means for receiving an input image obtained by a sensor of an agent. The apparatus further includes means for identifying a set of keypoints of the received image. Each of the keypoints may correspond to a different descriptor. The apparatus still further includes means for augmenting the descriptor of each of the keypoints with semantic information of the input image. The apparatus also includes means for identifying a target image based on one or more semantically augmented descriptors of the target image matching one or more semantically augmented descriptors of the input image. The apparatus further includes means for controlling an action of the agent in response to identifying the target.

In another aspect of the present disclosure, a non-transitory computer-readable medium with non-transitory program code recorded thereon for keypoint matching is disclosed. The program code is executed by a processor and includes program code to receive an input image obtained by a sensor of an agent. The program code further includes program code to identify a set of keypoints of the received image. Each of the keypoints may correspond to a different descriptor. The program code still further includes program code to augment the descriptor of each of the keypoints with semantic information of the input image. The program code also includes program code to identify a target image based on one or more semantically augmented descriptors of the target image matching one or more semantically augmented descriptors of the input image. The program code further includes program code to control an action of the agent in response to identifying the target.

Another aspect of the present disclosure is directed to an apparatus having a memory, one or more processors coupled to the memory, and instructions stored in the memory and operable, when executed by the processor, to cause the apparatus to receive an input image obtained by a sensor of an agent. The execution of the instructions also cause the apparatus to identify a set of keypoints of the received image. Each of the keypoints may correspond to a different descriptor. The execution of the instructions further cause the apparatus to augment the descriptor of each of the keypoints with semantic information of the input image. The execution of the instructions still further cause the apparatus to identify a target image based on one or more semantically augmented descriptors of the target image matching one or more semantically augmented descriptors of the input image. The execution of the instructions also cause the apparatus to control an action of the agent in response to identifying the target.

Aspects generally include a method, apparatus, system, computer program product, non-transitory computer-readable medium, user equipment, base station, wireless communications device, and processing system as substantially described with reference to and as illustrated by the accompanying drawings and specification.

The foregoing has outlined rather broadly the features and technical advantages of examples according to the disclosure in order that the detailed description that follows may be better understood. Additional features and advantages will be described. The conception and specific examples disclosed may be readily utilized as a basis for modifying or designing other structures for carrying out the same purposes of the present disclosure. Such equivalent constructions do not depart from the scope of the appended claims. Characteristics of the concepts disclosed, both their organization and method of operation, together with associated advantages will be better understood from the following description when considered in connection with the accompanying figures. Each of the figures is provided for the purposes of illustration and description, and not as a definition of the limits of the claims.

BRIEF DESCRIPTION OF THE DRAWINGS

The features, nature, and advantages of the present disclosure will become more apparent from the detailed description set forth below when taken in conjunction with the drawings in which like reference characters identify correspondingly throughout.

DETAILED DESCRIPTION

Figure 1:
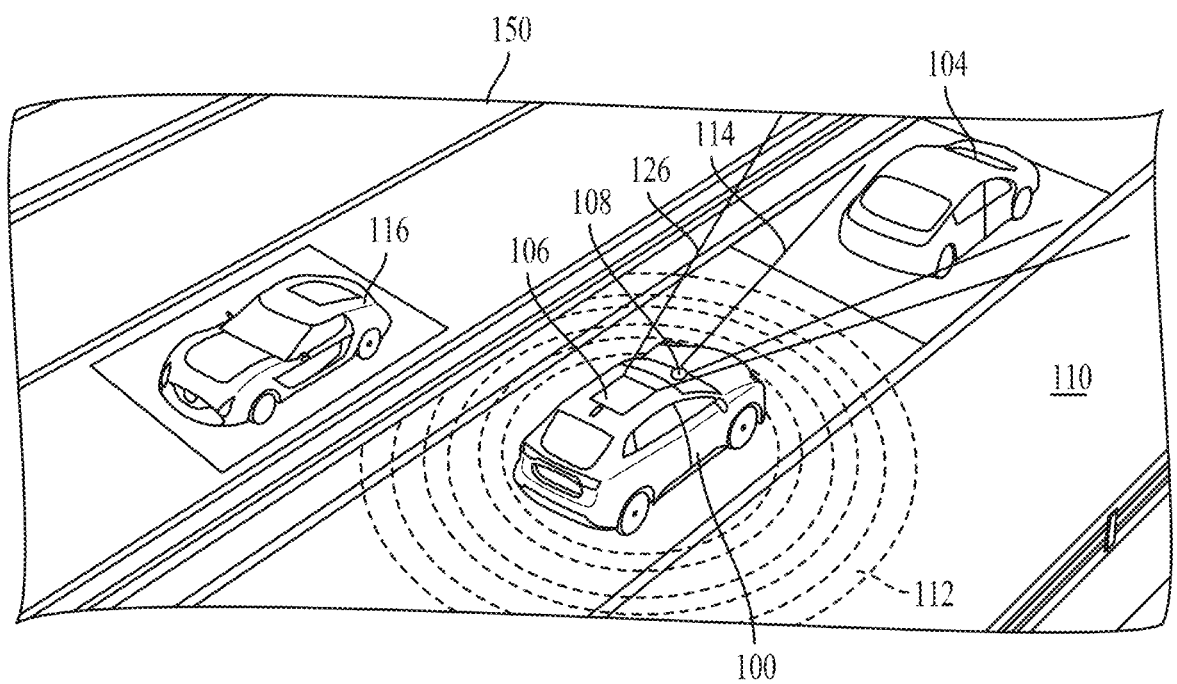
FIG. 1 illustrates an example of a vehicle in an environment according to aspects of the present disclosure.

The detailed description set forth below, in connection with the appended drawings, is intended as a description of various configurations and is not intended to represent the only configurations in which the concepts described herein may be practiced. The detailed description includes specific details for the purpose of providing a thorough understanding of the various concepts. It will be apparent to those skilled in the art, however, that these concepts may be practiced without these specific details. In some instances, well-known structures and components are shown in block diagram form in order to avoid obscuring such concepts.

An agent, such as an autonomous agent, may reconstruct a three-dimensional map of a scene based on one or more images obtained from a sensor. The agent may also localize its location in an environment (e.g., a map of the environment) based on sensor information (e.g., GPS information). Localization and scene reconstruction may be used to perform various tasks, such as scene understanding, motion planning, and/or obstacle avoidance. For example, the agent may autonomously navigate through an environment based on the localization information and the scene reconstruction. Depth estimation may be used to understand (e.g., reconstruct) the structure of a scene.

Conventional machine-vision based systems, such as autonomous vehicles, may use a LIDAR sensor to build a 3D spatial representation of the world. The 3D spatial representation is localized against a pre-built 3D map. In such conventional systems, keypoint matching may be specified for localizing the 3D representation against the pre-built 3D map to reconstruct a three-dimensional map of a scene based on one or more images, such as 3D images, obtained from a sensor, such as a LIDAR sensor. That is, conventional keypoint matching systems match 3D keypoints obtained from a LIDAR sensor to 3D keypoints of the pre-built map. Due to costs and accuracy, it may be desirable to match 2D keypoints to 3D keypoints of the pre-built map.

Specifically, LIDAR sensors used for 3D keypoint matching may be costly, bulky, and resource-intensive. Additionally, the LIDAR sensors' accuracy may be reduced in some environments, such as, for example, rain, fog, wet surfaces, non-retroreflective road markings, etc. In contrast, a camera, such as a red-green-blue (RGB) camera, may provide both a dense semantic and spatial understanding of the scene by reasoning across space (stereo, multi-camera) and time (multi-view reconstruction). Additionally, a camera may be less costly, smaller, and less resource-intensive in comparison to LIDAR. Therefore, it may be desirable to use one or more cameras for a machine-vision systems. Such cameras may be used for 2D keypoint matching.

Aspects of the present disclosure improve keypoint matching systems to match a 2D keypoint obtained from an image, such as a monocular image, with a 3D keypoint of a pre-built map. In some implementations, the LIDAR sensor may be replaced by a camera. In such implementations, a machine-vision system may be trained to match distinctly illuminated keypoints and viewpoint invariant keypoints to improve a localization function and a mapping function. Such machine-vision systems may generate consistent 3D maps by reliably matching and triangulating keypoints between frames in a monocular sequence. The matched keypoints may be localized against the pre-built map by using a 2D-3D matching method. In some examples, a created map may be semantically richer than a LIDAR-based map because an image, such as a monocular image, is semantically richer than an output of a LIDAR sensor. In such examples, the semantically richer map may improve one or more tasks, such as detecting map changes and online camera calibration. Some aspects of the present disclosure are also directed to improving a training process for the keypoint matching system.

FIG. 1 illustrates an example of an ego vehicle 100 (e.g., ego agent) in an environment 150 according to aspects of the present disclosure. As shown in FIG. 1, the ego vehicle 100 is traveling on a road 110. A first vehicle 104 (e.g., other agent) may be ahead of the ego vehicle 100, and a second vehicle 116 may be adjacent to the ego vehicle 100. In this example, the ego vehicle 100 may include a 2D camera 108, such as a 2D RGB camera, and a second sensor 106. The second sensor 106 may be another RGB camera or another type of sensor, such as RADAR and/or ultrasound. Additionally, or alternatively, the ego vehicle 100 may include one or more additional sensors. For example, the additional sensors may be side facing and/or rear facing sensors.

In one configuration, the 2D camera 108 captures a 2D image that includes objects in the 2D camera's 108 field of view 114. The second sensor 106 may generate one or more output streams. The 2D image captured by the 2D camera includes a 2D image of the first vehicle 104, as the first vehicle 104 is in the 2D camera's 108 field of view 114.

The information obtained from the sensors 106, 108 may be used to navigate the ego vehicle 100 along a route when the ego vehicle 100 is in an autonomous mode. The sensors 106, 108 may be powered from electricity provided from the vehicle's 100 battery (not shown). The battery may also power the vehicle's motor. The information obtained from the sensors 106, 108 may be used for keypoint matching.

As described, keypoint matching may be specified for one or both of image registration or localization. For example, keypoints may be matched between a query image and a database of images to localize the query image in the database. A keypoint matching system may be trained based on labeled data. Such training may be difficult due to a lack of consistency of training samples for interest points in natural images. Specifically, interest points are difficult to clearly and consistently define for a human annotator.

Some conventional systems train a keypoint estimation model using homography adaptation with non-spatial image augmentations to create 2D synthetic views. The homography adaptation trained models may fail to account for illumination changes and 3D non-planar scenes. Some other conventional systems may use a Structure-from-Motion (SfM) function to generate training samples under different viewpoints and lighting conditions. Such models are trained on small patches rather than whole images, thereby restricting an area from which the model may learn descriptors. Additionally, training time may increase based on the use of small patches. In still some other conventional systems, an off-the-shelf SfM function obtains respective depth maps as well as camera intrinsics and extrinsics of a training sequence. In such systems, ground truth keypoint correspondences between consecutive frames are determined from the camera intrinsics and extrinsics. Models trained with the off-the-shelf SfM function may not share computations between the detector and descriptor, thereby increasing resource use and reducing efficiency. Such models trained with the off-the-shelf SfM function may also use patches, which restrict the area from which the network can learn descriptors.

Still, some other conventional systems may first estimate 2D keypoints and descriptors for each image in a monocular sequence. A model of such system may then use a bundle adjustment method to classify a stability of the estimated 2D keypoints based on re-projection error. The stability may be used as a supervision signal to re-train the model. This model is not fully differentiable, thus, the model cannot be trained in an end-to-end manner. Additionally, the model is not semantically aware.

As described, conventional training methods may limit the performance of a keypoint matching system. Aspects of the present disclosure are directed to improving keypoint matching systems by augmenting a keypoint descriptor with semantic information. In some implementations, the descriptor may be augmented by embedding semantic information from another pre-trained segmentation network.

For machine-vision systems, as well as other types of systems, semantic segmentation accounts for semantic information of a scene and ignores the instance relationship between pixels with a same semantic label. In some examples, two different cars may receive the same label (e.g., car) in a semantic segmentation map. In contrast, instance segmentation identifies individual instances of the same object and may not identify uncountable objects (e.g., background objects).

A semantically segmented map may include labels for individual pixels of an input, such as a red-green-blue image. For example, in an image of a road, individual pixels may be associated with a label selected from one or more predetermined labels (e.g., semantic labels), such as car, road, background, sign, or other objects found in a road image. In this example, the agent may use semantic segmentation to distinguish the road from other objects, such that the agent may safely move within an environment.

Figure 2:
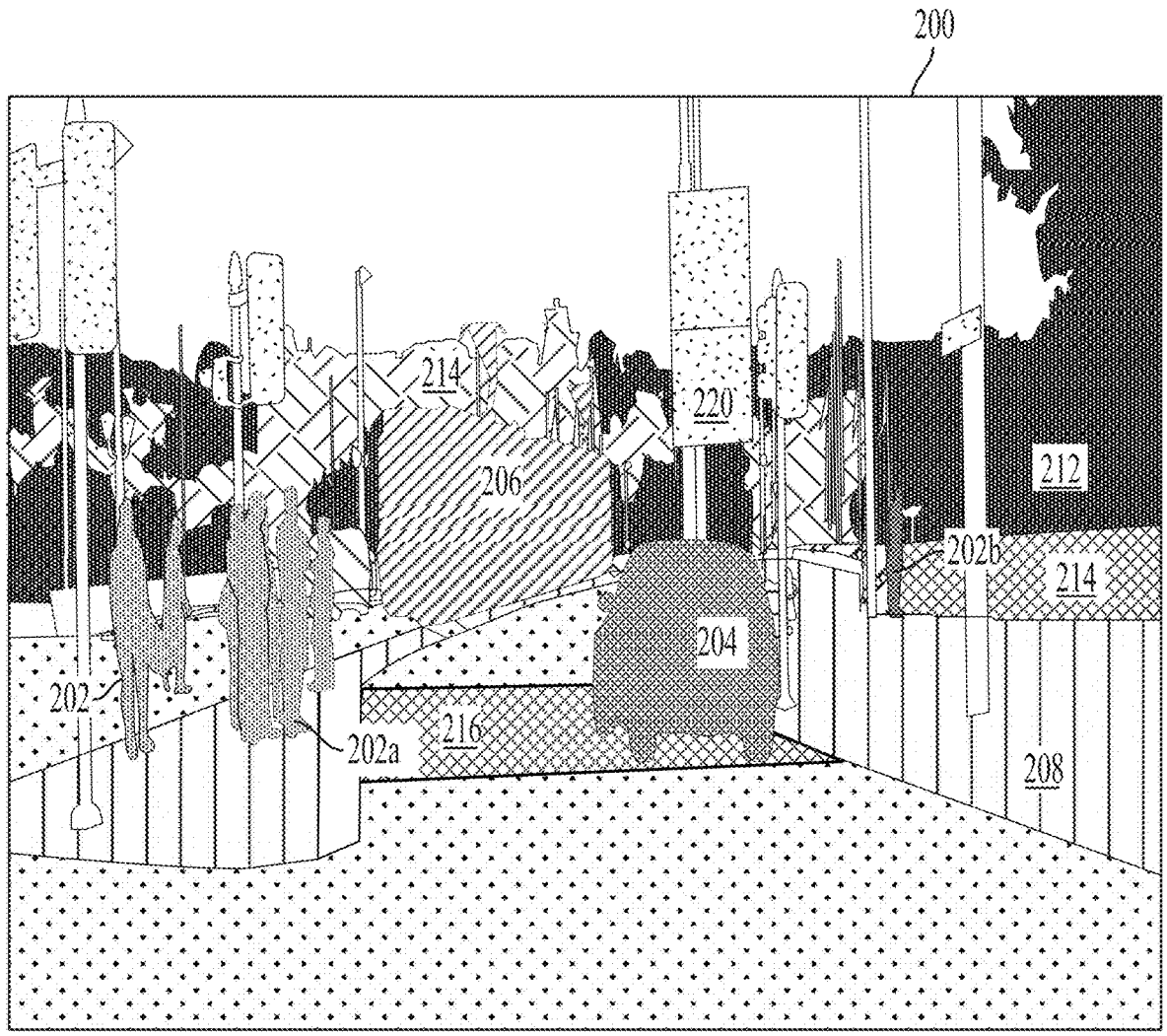
FIG. 2 illustrates an example of a training scheme according to aspects of the present disclosure.

FIG. 2 is a diagram illustrating an example of a semantically segmented map, in accordance with aspects of the present disclosure. In the example of FIG. 2, an agent, such as an autonomous vehicle or an ego vehicle 100 as described with reference to FIG. 1, may capture an image via a sensor, such as a monocular camera. In the example of FIG. 2, the image may be semantically segmented via a trained semantic segmentation model, such as an panoptic segmentation network, to generate the semantically segmented image 200. The panoptic segmentation network may be an example of an artificial neural network. The trained model may be incorporated with one or more systems of the agent. Additionally, or alternatively, the trained model may be stored in a remote system and the agent may wirelessly transmit the unlabeled image to receive the semantically segmented image 200.

In the example of FIG. 2, each pixel of the semantically segmented image 200 is associated with a semantic label. In the current example, the trained model labels pixels corresponding to pedestrians 202, cars 204, a train 206, sidewalks 208, street signs 210, vegetation 212, buildings 214 (e.g., structures), and crosswalks 216. Aspects of the present disclosure are not limited to labeling the discussed elements, other elements, such as poles for holding street signs may be labeled. For simplicity, some labels are omitted. Additionally, aspects of the present disclosure are not limited to labeling every pixel. In some examples, labels may be omitted from one or more pixels.

Figure 3:
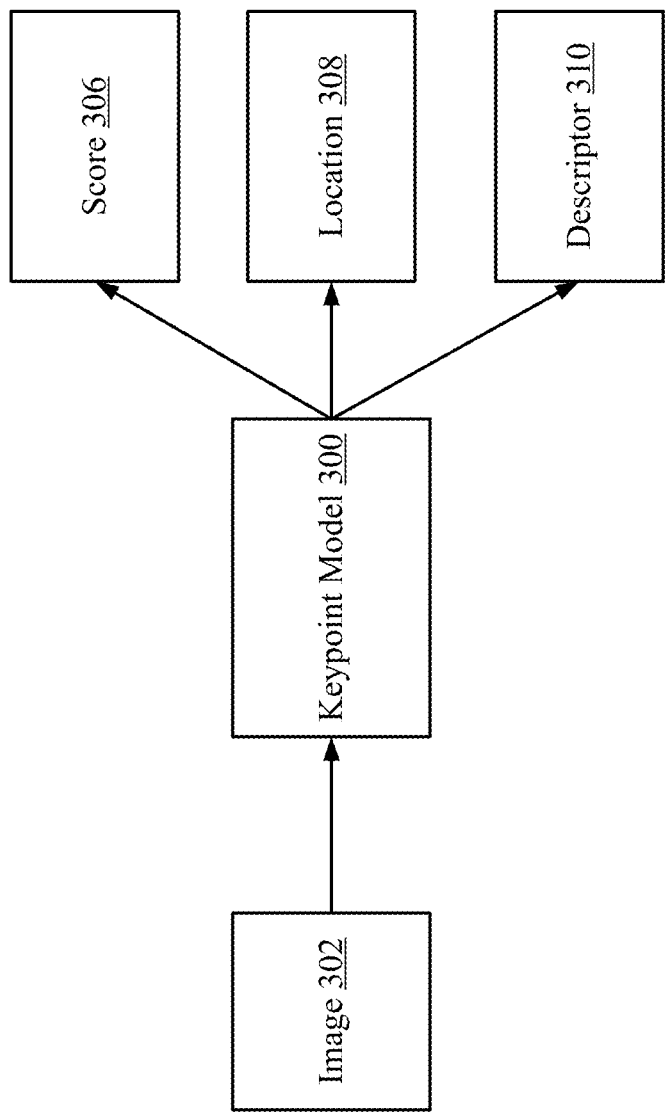
FIG. 3 is a diagram illustrating an example of a hardware implementation according to aspects of the present disclosure.

In some implementations, a descriptor of a keypoint model may be augmented with semantic information obtained from a trained semantic segmentation model, such as a panoptic segmentation network. FIG. 3 illustrates an example of a keypoint model 300, in accordance with aspects of the present disclosure. In some implementations, as shown in FIG. 3, the keypoint model 300 receives an input image 302 and outputs keypoint scores 306, keypoint locations 308, and keypoint descriptors 310 corresponding to the input image 302. In some examples, the input image 302 may be a 2D image captured by a camera, such as a monocular camera, integrated with an agent, such as an autonomous agent or an ego vehicle 100 as described with reference to FIG. 1.

A total number of keypoints in the input image 302 may vary based on a resolution of the input image. In some implementations, the keypoint model 300 is a component of the framework for matching a source image, such as the input image 302, to a target image. The keypoint model 300 may be trained to match the source image to the target image in a self-supervised manner. The source image and the target image may be related through a known homography transformation, which warps a pixel from the source image and maps it into the target image.

The keypoint model 300 may be an encoder-decoder style network. The encoder may include a number of VGG-style blocks, such as four VGG-style blocks, stacked to reduce the resolution (H×W) of the image 302. In some examples, the resolution is reduced to H/8×W/8. The reduced resolution may improve keypoint location predictions and descriptor predictions. In this low resolution embedding space, each pixel may correspond to a cell in the input image 302. In some examples, the cell is an 8×8 cell. The decoder may include three separate heads for the keypoints (e.g., locations), descriptors, and scores, respectively.

In some implementations, as shown in FIG. 3, for each pixel of the image 302 processed by the keypoint model 300, the keypoint model 300 outputs a keypoint location 308 relative to the grid, such as the 8×8 grid, corresponding to the respective pixel. For each pixel, the keypoint location 308 may be coordinates of the input image accounting for the grid's position in an embedding of the encoder of the keypoint model 300. In some such implementations, a corresponding keypoint location may be determined in a target image after warping via the known homography. For each warped keypoint, a closest corresponding keypoint in the target image may be associated with the keypoint of the source image 302 based on Euclidean distance. In some examples, keypoint pairs may be discarded when a distance between keypoints satisfies a discard condition, such as the distance being greater than a distance threshold.

In the example of FIG. 3, for each pixel of the image 302 processed by the keypoint model 300, the keypoint model 300 also outputs a keypoint descriptor 310. Each keypoint descriptor 310 may be a string determined based on features of the image 302 obtained from the encoding process of the keypoint model 300. In some implementations, the encoded image may be upsampled prior to determining each keypoint descriptor 310, such that each keypoint descriptor 310 captures a greater amount of details. The descriptor of each keypoint in the input image 302 may be obtained by sampling an appropriate location in a dense descriptor map. The associated descriptor in a target frame may be obtained by sampling the appropriate location in the target descriptor map based on the warped keypoint position.

Additionally, in some implementations, as shown in FIG. 3, the keypoint model 300 may generate a keypoint score 312 associated with each keypoint descriptor 310, respectively. At test time, reliable keypoints may be identified based on an associated keypoint score 312. A subset of the reliable keypoints may be selected for keypoint matching. In some examples, a reliable keypoint may be a keypoint associated with a keypoint score 312 that satisfies a reliability condition, such as having a keypoint score 312 that is greater than a threshold, or a keypoint score 312 within a top percentage of all keypoint scores 312. In some such examples, the reliable keypoints may be selected for matching, such that feature pairs may have consistent keypoint scores. Additionally, during training, the keypoint model 300 may learn to distinguish desirable keypoints based on the keypoint scores 312.

Figure 4:
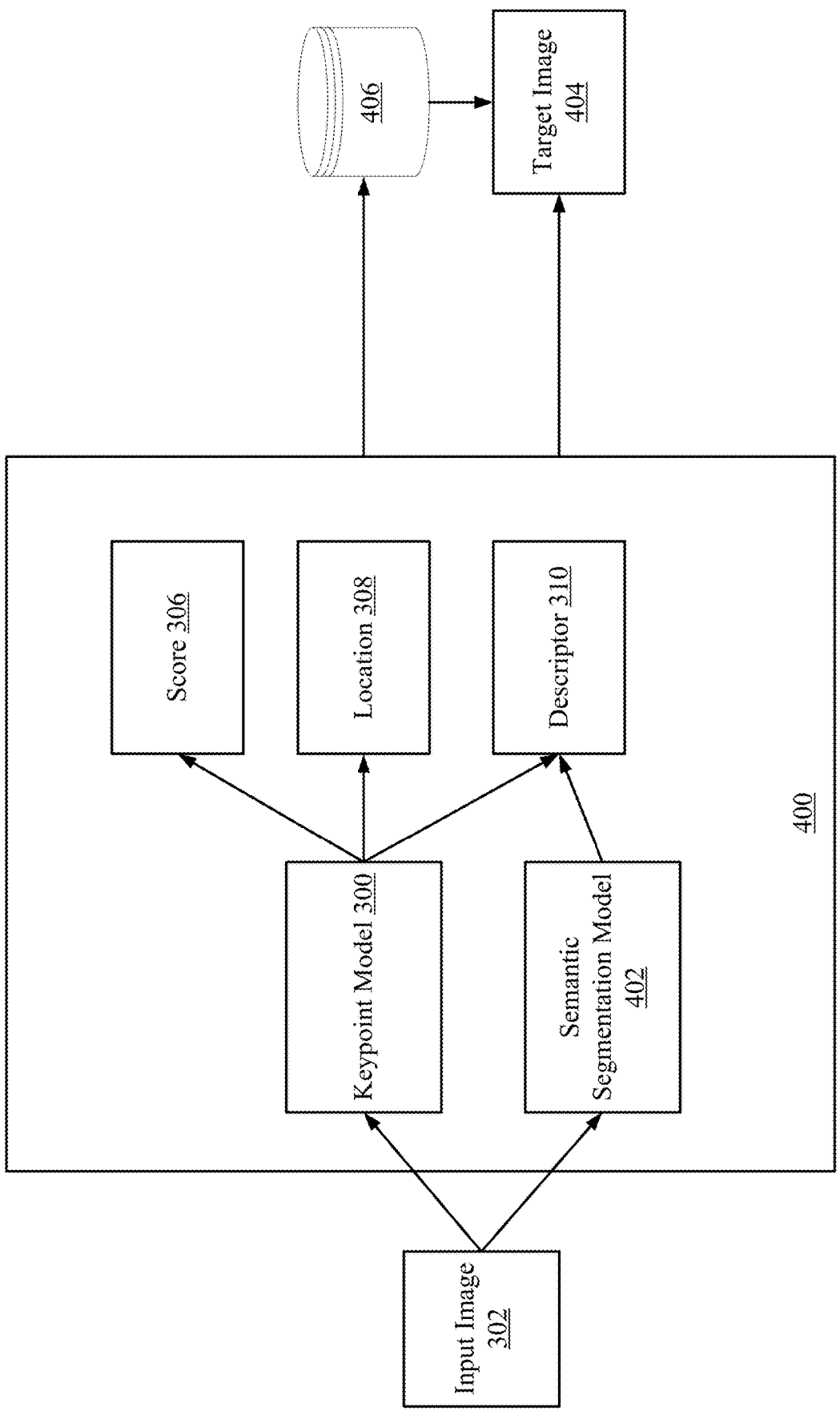
FIG. 4 illustrates a flow diagram for a method according to aspects of the present disclosure.

In some implementations, each keypoint descriptor 310 may be augmented with semantic information of a corresponding keypoint location. FIG. 4 is a block diagram illustrating an example of a semantically aware keypoint matching model 400, in accordance with aspects of the present disclosure. In the example of FIG. 4, an input image 302 is input to a keypoint model 300 to generate keypoint scores 306, keypoint locations 308, and keypoint descriptors 310 corresponding to the input image 302, as described with reference to FIG. 3. In some examples, the input image 302 may be referred to as a query image.

In some implementations, as shown in FIG. 4, the input image 302 may also be input to a semantic segmentation model 402. In the example of FIG. 4, the semantic segmentation model 402 is a component of the semantically aware keypoint matching model 400. Alternatively, the semantic segmentation model 402 may be a separate component working in conjunction with the semantically aware keypoint matching model 400. In some examples, the semantic segmentation model 402 may be a pre-trained panoptic segmentation network having an encoder-decoder architecture. The semantic segmentation model 402 may generate a semantically segmented image, such as the semantically segmented image 200 described with reference to FIG. 2. In some implementations, features of a semantic feature map may be output from decoders of the semantic segmentation model 402 and augmented with one or more layers, such as decoders or a final encoder output, of the keypoint model 300. That is, the semantic information of the input image 302 may be distilled with the keypoint descriptors 310 generated for the input image 302. As such, a pixel of the input image 302 may be associated with a keypoint descriptor 310 that is augmented with semantic information, such as semantic features and/or a semantic label.

In some implementations, the semantic features of the input image 302 may be embedded into a target space, such that nearest neighbor matching (e.g., using L1 or L2 distance) may be applied to find a matching pair of keypoints between frames, such as the input image 302 and the target image 404. In such implementations, the keypoint descriptors 310 are semantically aware. That is, the keypoint descriptors 310 include scene level information which improves the ability of the semantically aware keypoint matching model 400 to match keypoints between frames, such as the input image 302 and the target image 404. In some implementations, the semantic features are jointly optimized with local information (e.g., the keypoint descriptors 310). In such implementations, the keypoint matching may be more robust to different angles and/or lighting in comparison to conventional keypoint matching networks.

In the example of FIG. 4, the semantic segmentation model 400 may query a database 406 (e.g., a storage device) with the semantically aware descriptors to identify the target image 404. In some implementations, an image retrieval system associated with the database 406 may determine one or more matching image(s) by identifying one or more images of the multiple images stored in the database 406 matching the keypoint descriptors 310. The one or more matching images may be retrieved as the target image(s) 404 and provided as an output to the semantically aware keypoint matching model 400. Additionally, or alternatively, the target image 404 may be output to a component associated with the semantically aware keypoint matching model 400, such as a navigation component. In some implementations, the semantically aware keypoint matching model 400 may be a component of the image retrieval system (not shown in FIG. 4).

In some implementations, a final output, or the output of an intermediate layer, of the semantic segmentation model 402 may be further processed via an additional adaptation convolutional layer before embedding into a descriptor feature map corresponding to the keypoint descriptor 310.

In some implementations, the input image 302 may be one frame of a sequence of frames captured by a sensor, such as a monocular camera. The sequence of frames may be stored in a memory associated with the semantic segmentation model 402. The memory and the semantic segmentation model 402 may be components of a device or system of an agent, such as an autonomous vehicle. Aspects of the present disclosure are not limited to processing each frame of the sequence of frames. In some aspects, a subset of the sequence of frames may be processed for keypoint matching based on a desired task and/or a desired level of accuracy for the task, such as a localization task.

In some implementations, the semantically aware keypoint matching model 400 segments each input image 302 (e.g., each frame of a sequence of frames) into multiple regions. In such implementations, the semantically aware keypoint matching model 400 may also determine a set of keypoints for each input image 302. In some such implementations, the semantically aware keypoint matching model 400 selects a set of keypoints with keypoint scores 306 that satisfy selection criteria, such as the keypoint score of a keypoint being less than a threshold. In some examples, a keypoint may be an example of a reference element in the input image 302.

In some implementations, the semantically aware keypoint matching model 400 tracks one or more regions of the input image 302 (e.g., source image) to one or more regions of a target image, resulting in a matched region in the target image. The target image may be an image of a library of images stored in the memory associated with the semantically aware keypoint matching model 400. Each image of the library of images may include keypoints and corresponding descriptors. In some implementations, each descriptor is augmented with semantic segmentation information (e.g., semantic segmentation features).

In some implementations, the set of keypoints may be robust keypoints. Such keypoints may be repeated across multiple frames. The keypoints may be obtained using different techniques. In some examples, the keypoint model 300 may be trained in a self-supervised manner to detect keypoints of an input image 302. As described, in some implementations, the selected keypoints may be matched between the input image 302 and the target image 404. In some implementations, the keypoint matching considers both a similarity of keypoint descriptors 310 associated with keypoints of the input image 302 and the target image 404, as well as a similarity of semantic information associated with keypoints of the input image 302 and the target image 404. In some such implementations, the keypoint matching may be biased toward keypoints associated with the same semantic label.

As described, a keypoint descriptor 310 may provide appearance information of an associated keypoint. In some examples, for a keypoint, the associated keypoint descriptor 310 may provide information identifying one or more of the keypoint's color, average color, color histogram, shape, compactness, eccentricity, or texture (e.g., Gabor-based descriptor). Other types of information may be provided by each keypoint descriptor 310. The keypoints of the input image 302 and target image 404 may be matched based on a Euclidean distance in the descriptor space, while also considering the semantic information. Additionally, or alternatively, the keypoints of the input image 302 and target image 404 may be matched based on nearest neighbor matching.

Figure 5:
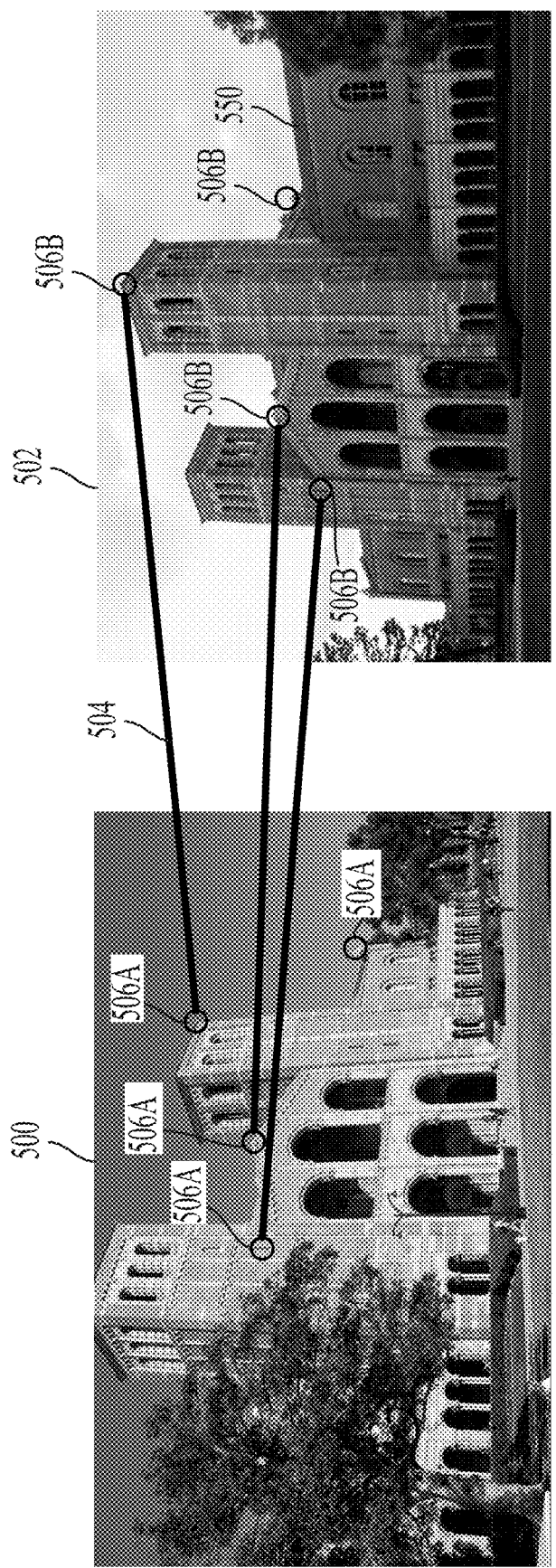
FIG. 5 is a diagram illustrating an example of a query image and a corresponding target image retrieved as a matching image associated with the query image, in accordance with aspects of the present disclosure.

FIG. 5 is a diagram illustrating an example of a query image 500 and a corresponding target image 502 retrieved as a matching image associated with the query image 500. As described, the target image 502 may be retrieved from a storage system, such as a memory device of the agent or a cloud-based storage system based on the semantically augmented descriptors of the query image 500 matching the semantically augmented descriptors of the target image 502. Feature correspondences between the query image 500 and the target image 502 are depicted using connector lines 504 between corresponding features. Connector lines 504 may connect a center of receptive fields for matching features. The connector lines 504 are provided for illustrative purposes. A number of connector lines 504 may correspond to a number of matching keypoints. In some examples, during testing (e.g., real-world deployment), the connector lines 504 may not be generated between matched images 500 and 502.

Figure 6:
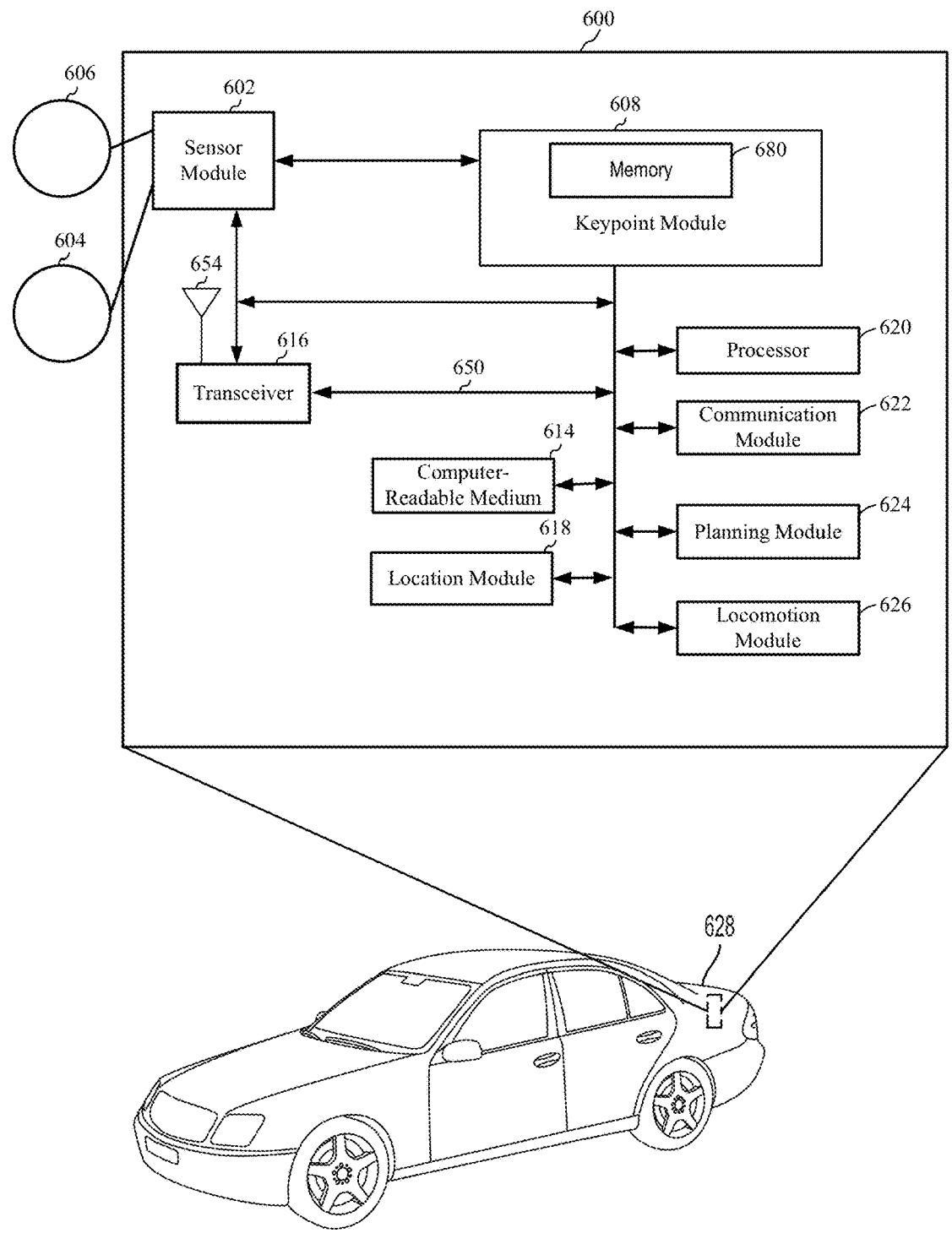
FIG. 6 is a diagram illustrating an example of a hardware implementation for a semantically aware keypoint matching system, according to aspects of the present disclosure.

FIG. 6 is a diagram illustrating an example of a hardware implementation for a semantically aware keypoint matching system 600, according to aspects of the present disclosure. The depth-aware semantically aware keypoint matching system 600 may be a component of a vehicle, a robotic device, or another device. For example, as shown in FIG. 4, the semantically aware keypoint matching system 600 is a component of a vehicle 628. The vehicle 628 may be an example of the ego vehicle 100 described with reference to FIG. 1. Aspects of the present disclosure are not limited to the semantically aware keypoint matching system 600 being a component of the vehicle 628, as other types of agents, such as a bus, boat, drone, or robot, are also contemplated for using the occlusion information prioritization system 600.

The vehicle 628 may operate in one or more of an autonomous operating mode, a semi-autonomous operating mode, and a manual operating mode. Furthermore, the vehicle 628 may be an electric vehicle, a hybrid vehicle, a fuel vehicle, or another type of vehicle.

The depth-aware semantically aware keypoint matching system 600 may be implemented with a bus architecture, represented generally by a bus 660. The bus 660 may include any number of interconnecting buses and bridges depending on the specific application of the semantically aware keypoint matching system 600 and the overall design constraints. The bus 660 links together various circuits, including one or more processors and/or hardware modules, represented by a processor 620, a communication module 622, a location module 618, a sensor module 602, a locomotion module 626, a navigation module 624, and a computer-readable medium 614. The bus 660 may also link various other circuits such as timing sources, peripherals, voltage regulators, and power management circuits, which are well known in the art, and therefore, will not be described any further.

The semantically aware keypoint matching system 600 includes a transceiver 616 coupled to the processor 620, the sensor module 602, a keypoint module 608, the communication module 622, the location module 618, the locomotion module 626, the navigation module 624, and the computer-readable medium 614. The transceiver 616 is coupled to an antenna 644.

The semantically aware keypoint matching system 600 includes the processor 620 coupled to the computer-readable medium 614. The processor 620 performs processing, including the execution of instructions stored on the computer-readable medium 614 providing functionality according to the disclosure. The instructions, when executed by the processor 620, cause the semantically aware keypoint matching system 600 to perform the various functions described for a particular device, such as the vehicle 628, or any of the modules 602, 608, 614, 616, 618, 620, 622, 624, 626. The computer-readable medium 614 may also be used for storing data that is manipulated by the processor 620 when executing the instructions.

The sensor module 602 may be used to obtain measurements via different sensors, such as a first sensor 606 and a second sensor 604. The first sensor 606 may be a vision sensor, such as a stereoscopic camera or a red-green-blue (RGB) camera, for capturing 2D images. The second sensor 604 may be a ranging sensor, such as a light detection and ranging (LIDAR) sensor or a radio detection and ranging (RADAR) sensor. Of course, aspects of the present disclosure are not limited to the aforementioned sensors as other types of sensors, such as, for example, thermal, sonar, and/or lasers are also contemplated for either of the sensors 604, 606.

The measurements of the first sensor 606 and the second sensor 604 may be processed by one or more of the processor 620, the sensor module 602, the keypoint module 608, the communication module 622, the location module 618, the locomotion module 626, the navigation module 624, in conjunction with the computer-readable medium 614 to implement the functionality described herein. In one configuration, the data captured by the first sensor 606 and the second sensor 604 may be transmitted to an external device via the transceiver 616. The first sensor 606 and the second sensor 604 may be coupled to the vehicle 628 or may be in communication with the vehicle 628.

The location module 618 may be used to determine a location of the vehicle 628. For example, the location module 618 may use a global positioning system (GPS) to determine the location of the vehicle 628. The communication module 622 may be used to facilitate communications via the transceiver 616. For example, the communication module 622 may be configured to provide communication capabilities via different wireless protocols, such as WiFi, long term evolution (LTE), 4G, new radio (NR) (e.g., 5G), etc. The communication module 622 may also be used to communicate with other components of the vehicle 628 that are not modules of the occlusion information prioritization system 600.

The locomotion module 626 may be used to facilitate locomotion of the vehicle 628. As an example, the locomotion module 626 may control a movement of the wheels. As another example, the locomotion module 626 may be in communication with one or more power sources of the vehicle 628, such as a motor and/or batteries. Of course, aspects of the present disclosure are not limited to providing locomotion via wheels and are contemplated for other types of components for providing locomotion, such as propellers, treads, fins, and/or jet engines.

The semantically aware keypoint matching system 600 also includes the navigation module 624 for planning a route or controlling the locomotion of the vehicle 628, via the locomotion module 626. The various modules in FIG. 6 may be software modules running in the processor 620, resident/stored in the computer-readable medium 614, one or more hardware modules coupled to the processor 620, or some combination thereof.

The keypoint module 608 may identify keypoints for image registration and/or localization, the keypoint module 608 may be an example of the semantically aware keypoint matching model 400 as described in reference to FIG. 4. The keypoint module 608 may include a memory 680. The memory 680 may be integrated with the keypoint module 608 or may be a component of the image localization system 600. The memory 680 may include volatile and/or non-volatile memory. For example, the memory 680 may be read only memory (ROM), programmable ROM (PROM), electronic programmable ROM (EPROM), electronic erasable PROM (EEPROM), flash memory, random access memory (RAM), or other types of volatile or non-volatile memory. Additionally, the RAM may be, for example, synchronous RAM (SRAM), dynamic RAM (DRAM), synchronous DRAM (SDRAM), double data rate SDRAM (DDR SDRAM), enhanced SDRAM (ESDRAM), sync link DRAM, (SLDRAM), direct RAM bus RAM (DRRAM), or other types of RAM.

The keypoint module 608 may work in conjunction with one or more of the memory 680, the processor 620, the communication module 622, the location module 618, the sensor module 602, the locomotion module 626, the navigation module 624, and the computer-readable medium 614 to perform one or more functions described below. In some examples, the keypoint module 608 receives an input image obtained by a sensor of an agent. Additionally, the keypoint module 608 may identify a set of keypoints of the received image, each of the keypoints corresponding to a different descriptor. In such examples, the keypoint module 608 may also augment the descriptor of each of the keypoints with semantic information of the input image. Furthermore, the keypoint module 608 may identify a target image based on one or more semantically augmented descriptors of the target image matching one or more semantically augmented descriptors of the input image. Finally, the keypoint module 608 may control an action of the agent in response to identifying the target. The keypoint module 608 is not limited to performing the described functions, other functions are contemplated.

The National Highway Traffic Safety Administration (NHTSA) has defined different "levels" of autonomous vehicles (e.g., Level 0, Level 1, Level 2, Level 3, Level 4, and Level 5). For example, if an autonomous vehicle has a higher level number than another autonomous vehicle (e.g., Level 3 is a higher level number than Levels 2 or 1), then the autonomous vehicle with a higher level number offers a greater combination and quantity of autonomous features relative to the vehicle with the lower level number. These different levels of autonomous vehicles are described briefly below.

Level 0: In a Level 0 vehicle, the set of advanced driver assistance system (ADAS) features installed in a vehicle provide no vehicle control, but may issue warnings to the driver of the vehicle. A vehicle which is Level 0 is not an autonomous or semi-autonomous vehicle.

Level 1: In a Level 1 vehicle, the driver is ready to take driving control of the autonomous vehicle at any time. The set of ADAS features installed in the autonomous vehicle may provide autonomous features such as: adaptive cruise control (ACC); parking assistance with automated steering; and lane keeping assistance (LKA) type II, in any combination.

Level 2: In a Level 2 vehicle, the driver is obliged to detect objects and events in the roadway environment and respond if the set of ADAS features installed in the autonomous vehicle fail to respond properly (based on the driver's subjective judgement). The set of ADAS features installed in the autonomous vehicle may include accelerating, braking, and steering. In a Level 2 vehicle, the set of ADAS features installed in the autonomous vehicle can deactivate immediately upon takeover by the driver.

Level 3: In a Level 3 ADAS vehicle, within known, limited environments (such as freeways), the driver can safely turn their attention away from driving tasks, but must still be prepared to take control of the autonomous vehicle when needed.

Level 4: In a Level 4 vehicle, the set of ADAS features installed in the autonomous vehicle can control the autonomous vehicle in all but a few environments, such as severe weather. The driver of the Level 4 vehicle enables the automated system (which is comprised of the set of ADAS features installed in the vehicle) only when it is safe to do so. When the automated Level 4 vehicle is enabled, driver attention is not required for the autonomous vehicle to operate safely and consistent within accepted norms.

Level 5: In a Level 5 vehicle, other than setting the destination and starting the system, no human intervention is involved. The automated system can drive to any location where it is legal to drive and make its own decision (which may vary based on the jurisdiction where the vehicle is located).

A highly autonomous vehicle (HAV) is an autonomous vehicle that is Level 3 or higher. Accordingly, in some configurations the vehicle 628 may be one of a Level 0 non-autonomous vehicle, a Level 1 autonomous vehicle, a Level 2 autonomous vehicle, a Level 3 autonomous vehicle, a Level 4 autonomous vehicle, or a Level 5 autonomous vehicle.

Figure 7:
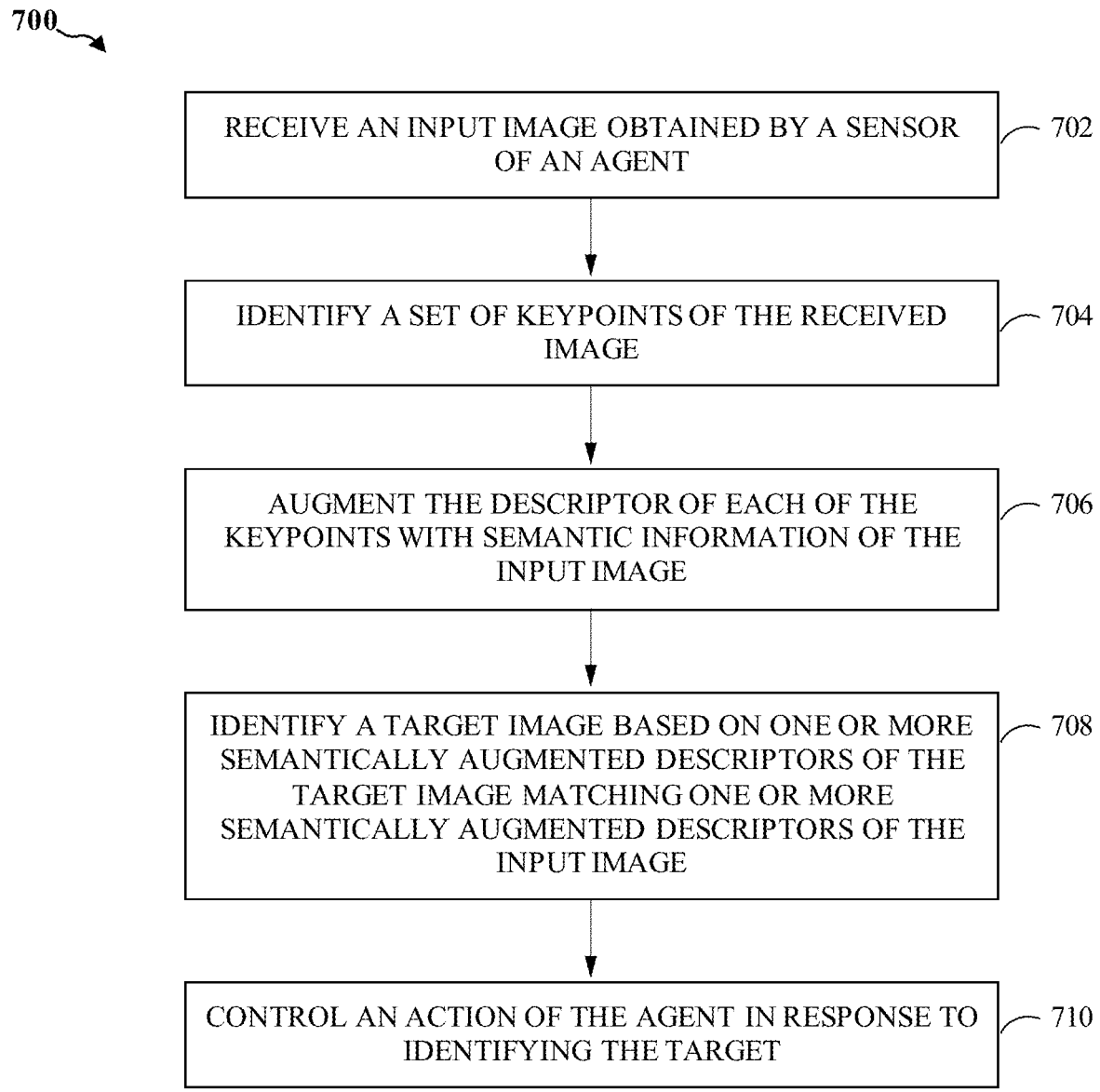
FIG. 7 is a diagram illustrating an example process performed, for example, with a semantically aware keypoint matching model, in accordance with various aspects of the present disclosure.

FIG. 7 is a diagram illustrating an example process 700 performed, for example, with a semantically aware keypoint matching model, in accordance with various aspects of the present disclosure. The example process 700 is an example of using keypoint descriptors augmented with semantic information to match a query image with a target image. In some implementations, the process 700 may be performed by a semantically aware keypoint matching model, such as the semantically aware keypoint matching model 400 described above with reference to FIG. 4. The semantically aware keypoint matching model may be a component of an agent, such as the ego vehicle 100 or the vehicle 628 described above with reference to FIGS. 1 and 6, respectively.

In some implementations, the process 700 begins in block 702 with receiving an input image obtained by a sensor of an agent. In block 704, the process 700 identifies a set of keypoints of the received image. Each of the keypoints may correspond to a different descriptor. In block 706, the process 700 augments the descriptor of each of the keypoints with semantic information of the input image. Furthermore, in block 708, the process 700 identifies a target image based on one or more semantically augmented descriptors of the target image matching one or more semantically augmented descriptors of the input image. Finally, in block 710, the process 700 controls an action of the agent in response to identifying the target Based on the teachings, one skilled in the art should appreciate that the scope of the present disclosure is intended to cover any aspect of the present disclosure, whether implemented independently of or combined with any other aspect of the present disclosure. For example, an apparatus may be implemented or a method may be practiced using any number of the aspects set forth. In addition, the scope of the present disclosure is intended to cover such an apparatus or method practiced using other structure, functionality, or structure and functionality in addition to, or other than the various aspects of the present disclosure set forth. It should be understood that any aspect of the present disclosure may be embodied by one or more elements of a claim.

The word "exemplary" is used herein to mean "serving as an example, instance, or illustration." Any aspect described herein as "exemplary" is not necessarily to be construed as preferred or advantageous over other aspects.

Although particular aspects are described herein, many variations and permutations of these aspects fall within the scope of the present disclosure. Although some benefits and advantages of the preferred aspects are mentioned, the scope of the present disclosure is not intended to be limited to particular benefits, uses or objectives. Rather, aspects of the present disclosure are intended to be broadly applicable to different technologies, system configurations, networks and protocols, some of which are illustrated by way of example in the figures and in the following description of the preferred aspects. The detailed description and drawings are merely illustrative of the present disclosure rather than limiting, the scope of the present disclosure being defined by the appended claims and equivalents thereof.

As used herein, the term "determining" encompasses a wide variety of actions. For example, "determining" may include calculating, computing, processing, deriving, investigating, looking up (e.g., looking up in a table, a database or another data structure), ascertaining and the like. Additionally, "determining" may include receiving (e.g., receiving information), accessing (e.g., accessing data in a memory) and the like. Furthermore, "determining" may include resolving, selecting, choosing, establishing, and the like.

As used herein, a phrase referring to "at least one of" a list of items refers to any combination of those items, including single members. As an example, "at least one of: a, b, or c" is intended to cover: a, b, c, a-b, a-c, b-c, and a-b-c.

The various illustrative logical blocks, modules and circuits described in connection with the present disclosure may be implemented or performed with a processor specially configured to perform the functions discussed in the present disclosure. The processor may be a neural network processor, a digital signal processor (DSP), an application specific integrated circuit (ASIC), a field programmable gate array signal (FPGA) or other programmable logic device (PLD), discrete gate or transistor logic, discrete hardware components or any combination thereof designed to perform the functions described herein. Alternatively, the processing system may comprise one or more neuromorphic processors for implementing the neuron models and models of neural systems described herein. The processor may be a microprocessor, controller, microcontroller, or state machine specially configured as described herein. A processor may also be implemented as a combination of computing devices, e.g., a combination of a DSP and a microprocessor, a plurality of microprocessors, one or more microprocessors in conjunction with a DSP core, or such other special configuration, as described herein.

The steps of a method or algorithm described in connection with the present disclosure may be embodied directly in hardware, in a software module executed by a processor, or in a combination of the two. A software module may reside in storage or machine readable medium, including random access memory (RAM), read only memory (ROM), flash memory, erasable programmable read-only memory (EPROM), electrically erasable programmable read-only memory (EEPROM), registers, a hard disk, a removable disk, a CD-ROM or other optical disk storage, magnetic disk storage or other magnetic storage devices, or any other medium that can be used to carry or store desired program code in the form of instructions or data structures and that can be accessed by a computer. A software module may comprise a single instruction, or many instructions, and may be distributed over several different code segments, among different programs, and across multiple storage media. A storage medium may be coupled to a processor such that the processor can read information from, and write information to, the storage medium. In the alternative, the storage medium may be integral to the processor.

The methods disclosed herein comprise one or more steps or actions for achieving the described method. The method steps and/or actions may be interchanged with one another without departing from the scope of the claims. In other words, unless a specific order of steps or actions is specified, the order and/or use of specific steps and/or actions may be modified without departing from the scope of the claims.

The functions described may be implemented in hardware, software, firmware, or any combination thereof. If implemented in hardware, an example hardware configuration may comprise a processing system in a device. The processing system may be implemented with a bus architecture. The bus may include any number of interconnecting buses and bridges depending on the specific application of the processing system and the overall design constraints. The bus may link together various circuits including a processor, machine-readable media, and a bus interface. The bus interface may be used to connect a network adapter, among other things, to the processing system via the bus. The network adapter may be used to implement signal processing functions. For certain aspects, a user interface (e.g., keypad, display, mouse, joystick, etc.) may also be connected to the bus. The bus may also link various other circuits such as timing sources, peripherals, voltage regulators, power management circuits, and the like, which are well known in the art, and therefore, will not be described any further.

The processor may be responsible for managing the bus and processing, including the execution of software stored on the machine-readable media. Software shall be construed to mean instructions, data, or any combination thereof, whether referred to as software, firmware, middleware, microcode, hardware description language, or otherwise.

In a hardware implementation, the machine-readable media may be part of the processing system separate from the processor. However, as those skilled in the art will readily appreciate, the machine-readable media, or any portion thereof, may be external to the processing system. By way of example, the machine-readable media may include a transmission line, a carrier wave modulated by data, and/or a computer product separate from the device, all which may be accessed by the processor through the bus interface. Alternatively, or in addition, the machine-readable media, or any portion thereof, may be integrated into the processor, such as the case may be with cache and/or specialized register files. Although the various components discussed may be described as having a specific location, such as a local component, they may also be configured in various ways, such as certain components being configured as part of a distributed computing system.

The machine-readable media may comprise a number of software modules. The software modules may include a transmission module and a receiving module. Each software module may reside in a single storage device or be distributed across multiple storage devices. By way of example, a software module may be loaded into RAM from a hard drive when a triggering event occurs. During execution of the software module, the processor may load some of the instructions into cache to increase access speed. One or more cache lines may then be loaded into a special purpose register file for execution by the processor. When referring to the functionality of a software module below, it will be understood that such functionality is implemented by the processor when executing instructions from that software module. Furthermore, it should be appreciated that aspects of the present disclosure result in improvements to the functioning of the processor, computer, machine, or other system implementing such aspects.

If implemented in software, the functions may be stored or transmitted over as one or more instructions or code on a computer-readable medium. Computer-readable media include both computer storage media and communication media including any storage medium that facilitates transfer of a computer program from one place to another.

Further, it should be appreciated that modules and/or other appropriate means for performing the methods and techniques described herein can be downloaded and/or otherwise obtained by a user terminal and/or base station as applicable. For example, such a device can be coupled to a server to facilitate the transfer of means for performing the methods described herein. Alternatively, various methods described herein can be provided via storage means, such that a user terminal and/or base station can obtain the various methods upon coupling or providing the storage means to the device. Moreover, any other suitable technique for providing the methods and techniques described herein to a device can be utilized.

It is to be understood that the claims are not limited to the precise configuration and components illustrated above. Various modifications, changes, and variations may be made in the arrangement, operation, and details of the methods and apparatus described above without departing from the scope of the claims.

What is claimed is:

1. A method for keypoint matching performed by a semantically aware keypoint matching model, the method comprising:
   generating a semanticly segmented image from an image captured by a sensor of an agent, the semanticly segmented image associating a respective semantic label with each pixel of a group of pixels associated with the image;
   generating a set of augmented keypoint descriptors by augmenting, for each keypoint of the set of keypoints associated with the image, a keypoint descriptor with semantic information associated with one or more pixels, of the semanticaly segmented image, corresponding to the keypoint; and
   controlling an action of the agent in accordance with identifying a target image having one or more first augmented keypoint descriptors that match one or more second augmented keypoint descriptors of the set of augmented keypoint descriptors.

2. The method of claim 1, further comprising identifying the one or more first augmented keypoint descriptors of the target image matching the one or more second augmented keypoint descriptors of the image based on a nearest neighbor matching function.

3. The method of claim 2, further comprising biasing the matching of the one or more first augmented keypoint descriptors of the target image and the one or more second augmented keypoint descriptors toward two or more descriptors having matching semantic labels.

4. The method of claim 1, further comprising identifying a current location of the agent based on the target image, wherein controlling the action of the agent comprises navigating to a new location from the current location.

5. The method of claim 1, wherein:
   the target image is identified from a plurality of stored images; and
   each one of the stored images is associated with one or more augmented keypoint descriptors.

6. The method of claim 1, wherein the agent is an autonomous vehicle or a semi-autonomous vehicle.

7. The method of claim 1, wherein the image is a monocular image.

8. An apparatus for keypoint matching performed by a semantically aware keypoint matching model, comprising:
   one or more processors; and
   one or more memories coupled with the one or more processors and storing instructions operable, when executed by the one or more processors, to cause the apparatus to:
   generate a semanticly segmented image from an image captured by a sensor of an agent, the semanticly segmented image associating a respective semantic label with each pixel of a group of pixels associated with the image;
   generate a set of augmented keypoint descriptors by augmenting, for each keypoint of the set of keypoints associated with the image, a keypoint descriptor with semantic information associated with one or more pixels, of the semanticaly segmented image, corresponding to the keypoint; and
   control an action of the agent in accordance with identifying a target image having one or more first augmented keypoint descriptors that match one or more second augmented keypoint descriptors of the set of augmented keypoint descriptors.

9. The apparatus of claim 8, wherein execution of the instructions further cause the apparatus to identify the one or more first augmented keypoint descriptors of the target image matching the one or more second augmented keypoint descriptors of the image based on a nearest neighbor matching function.

10. The apparatus of claim 9, wherein execution of the instructions further cause the apparatus to bias the matching of the one or more first augmented keypoint descriptors of the target image and the one or more second augmented keypoint descriptors toward two or more descriptors having matching semantic labels.

11. The apparatus of claim 8, wherein execution of the instructions further cause the apparatus to identify a current location of the agent based on the target image, wherein controlling the action of the agent comprises navigating to a new location from the current location.

12. The apparatus of claim 8, wherein:
the target image is identified from a plurality of stored images; and
each one of the stored images is associated with one or more augmented keypoint descriptors.

13. The apparatus of claim 8, wherein the agent is an autonomous vehicle or a semi-autonomous vehicle.

14. The apparatus of claim 8, wherein the image is a monocular image.

15. A non-transitory computer-readable medium having program code recorded thereon for keypoint matching performed by a semantically aware keypoint matching model, the program code executed by a processor and comprising:
program code to generate a semanticly segmented image from an image captured by a sensor of an agent, the semanticly segmented image associating a respective semantic label with each pixel of a group of pixels associated with the image;
program code to generate a set of augmented keypoint descriptors by augmenting, for each keypoint of the set of keypoints associated with the image, a keypoint descriptor with semantic information associated with one or more pixels, of the semanticaly segmented image, corresponding to the keypoint; and
program code to control an action of the agent in accordance with identifying a target image having one or more first augmented keypoint descriptors that match one or more second augmented keypoint descriptors of the set of augmented keypoint descriptors.

16. The non-transitory computer-readable medium of claim 15, wherein the program code further comprises program code to identify the one or more first augmented keypoint descriptors of the target image matching the one or more second augmented keypoint descriptors of the image based on a nearest neighbor matching function.

17. The non-transitory computer-readable medium of claim 16, wherein the program code further comprises program code to bias the matching of the one or more first augmented keypoint descriptors of the target image and the one or more second augmented keypoint descriptors toward two or more descriptors having matching semantic labels.

18. The non-transitory computer-readable medium of claim 15, wherein the program code further comprises program code to identify a current location of the agent based on the target image, wherein controlling the action of the agent comprises navigating to a new location from the current location.

19. The non-transitory computer-readable medium of claim 15, wherein:
the target image is identified from a plurality of stored images; and
each one of the stored images is associated with one or more augmented keypoint descriptors.

20. The non-transitory computer-readable medium of claim 15, wherein the agent is an autonomous vehicle or a semi-autonomous vehicle.

\* \* \* \* \*